(12) United States Patent
Price (10) Patent No.: US 8,132,004 B2
(45) Date of Patent: Mar. 6, 2012

(54) MULTIPLE INDEPENDENT LEVELS OF SECURITY CONTAINING MULTI-LEVEL SECURITY INTERFACE

(75) Inventor: Darrel J. Price, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 788 days.

(21) Appl. No.: 12/137,668

(22) Filed: Jun. 12, 2008

(65) Prior Publication Data

US 2009/0319787 A1    Dec. 24, 2009

(51) Int. Cl.
*F04L 29/06* (2006.01)
(52) U.S. Cl. ....................................................... 713/166
(58) Field of Classification Search .................... 713/166
See application file for complete search history.

(56) References Cited

U.S. PATENT DOCUMENTS

| | | | |
|---|---|---|---|
| 5,802,178 A | 9/1998 | Holden et al. | |
| 6,067,620 A | 5/2000 | Holden et al. | |
| 6,304,973 B1 | 10/2001 | Williams | |
| 7,069,437 B2 | 6/2006 | Williams | |
| 7,277,404 B2 | 10/2007 | Tanzella et al. | |
| 7,293,175 B2 | 11/2007 | Brown et al. | |
| 7,356,695 B2 | 4/2008 | LiVecchi | |
| 7,681,036 B1 * | 3/2010 | Zuber et al. | 713/166 |
| 2006/0236365 A1 | 10/2006 | Pham | |
| 2007/0127417 A1 * | 6/2007 | Kalika | 370/338 |
| 2007/0255942 A1 | 11/2007 | Weller et al. | |

FOREIGN PATENT DOCUMENTS

| | | |
|---|---|---|
| EP | 0849680 A2 | 6/1998 |
| EP | 1318645 A2 | 6/2003 |

OTHER PUBLICATIONS

International Search Report and Written Opinion of PCT/US2009/043563; Nov. 17, 2009; 14 pages.*

* cited by examiner

*Primary Examiner* — Kambiz Zand
*Assistant Examiner* — Stephen Sanders
(74) *Attorney, Agent, or Firm* — Armstrong Teasdale LLP (57) ABSTRACT

Methods and systems for enabling security in transferring data from a single level MILS partition to the multiple level LAN. When a frame is received from an external stack via a network interface card, the frame contains a security classification, which is compared to the security classifications assigned to a plurality of internal stacks. Once a match is obtained, the frame is forwarded to the internal stack corresponding to the security classification in the frame assigned by the external stack. When a frame is received from one of the plurality of internal stacks, no security classification exists within the frame. A determination of the security classification assigned to the internal stack, which is then written into a security label in the frame. Once the security label is attached to the frame, the frame is sent to the external stack via a network interface card.

17 Claims, 7 Drawing Sheets

MULTIPLE INDEPENDENT LEVELS OF SECURITY CONTAINING MULTI-LEVEL SECURITY INTERFACE

FIELD OF THE INVENTION

The field of the disclosure relates generally to multiple independent levels of security, and more specifically to an interface for multiple independent levels of security each containing multi-level security.

Multiple independent Levels of Security (MILS) is a high assurance security computer architecture based on the concepts of separation and controlled information flow. MILS is implemented through the utilization of separation mechanisms that support both untrusted and trustworthy components, thus ensuring that the total security solution is non-bypassable, evaluatable, always invoked, and tamperproof. A MILS solution allows for independent evaluation of security components and trusted composition. A system incorporating a MILS solution, sometimes referred to as a MILS system, employs one or more separation mechanisms (e.g., separation kernel, separation communication system, physical separation) to maintain assured data and process separation. A MILS system supports enforcement of one or more application/system specific security policies by authorizing information flow only between components in the same security domain or through trustworthy security monitors (e.g., access control guards, downgraders, crypto devices, etc).

To accommodate multiple independent levels of security (MILS) on a single platform, a prior system with a MILS implementation utilizes multiple single level Local Area Networks (LANs). Processing and commercial off the shelf (COTS) stacks are coupled to the MILS system. Each stack uses a dedicated network interface card (NIC), where each NIC requires separate wiring and a port on a high assurance switch increasing the size and weight of the platform and power required by the platform, or connections to physically separated LANs, increasing size, weight, and power issues, the interface to the high assurance switch can be collapsed to use a single NIC for a plurality of stacks.

One problem of the existing system derives from the transferring of data from a single level MILS partition to the multiple level LAN. To transfer the data, the data is received in multiple frames, where each frame is of a finite size. The creation and parsing of frames is done by the stacks which are typically very large and complex applications and therefore difficult to create a high robustness, fill featured stack.

Another problem arises when a commercial off the shelf (COTS) stack is utilized for a different instance of the stack, in a different partition, for every security level. The problem being that stacks typically interface directly with the NIC for the transmission and reception of frames and the mapping of the same memory or register space to partitions of differing security levels is not allowed for security reasons.

BRIEF DESCRIPTION OF THE INVENTION

Embodiments of the invention enable security in transferring data from a single level MILS partition to the multiple level LAN. Each internal stack is associated with a security classification stored in memory. When a frame is received from an external stack via a network interface card, the frame contains a security classification. The security classification is compared to the security classifications assigned to a plurality of internal stacks. Once a match is obtained, the frame is forwarded to the internal stack corresponding to the security classification assigned by the external stack to the frame.

Furthermore, when a frame is received from one of a plurality of internal stacks destined for an external stack coupled to a network via a network interface card a security classification will not be written in the frame by the internal stack. A determination of the security classification assigned to the internal stack is written into a security label in the frame. Once the security label is attached to the frame, the frame is sent to the external stack via a network interface card.

This summary is provided to introduce a selection of concepts in a simplified form that are filler described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the invention may be better understood by referring to the following descriptions in conjunction with the accompanying drawings.

DETAILED DESCRIPTION OF THE INVENTION

Embodiments of the invention, set forth below, enable a computing device with multiple stacks to provide a Multiple Independent Levels of Security (MILS) containing Multi-Level Security (MLS) (MILS/MLS) model that facilitates and supports sharing secured information and access to the various stacks. Such security when sharing of information and access to various stacks provides a hard partition blocking those access and information queries that are unauthorized, dependent on the level of security implemented on a per stack basis. Aspects of the invention may be implemented with a device such as the middleware partition shown in FIG. 4, which is further described herein.

As used herein, a stack is a software application that implements the Internet protocol suite. The Internet protocol suite is a set of communications protocols on which the Internet and most commercial networks run. It can be viewed as a set of layers, each of which provides services to the layer above it.

Figure 1:
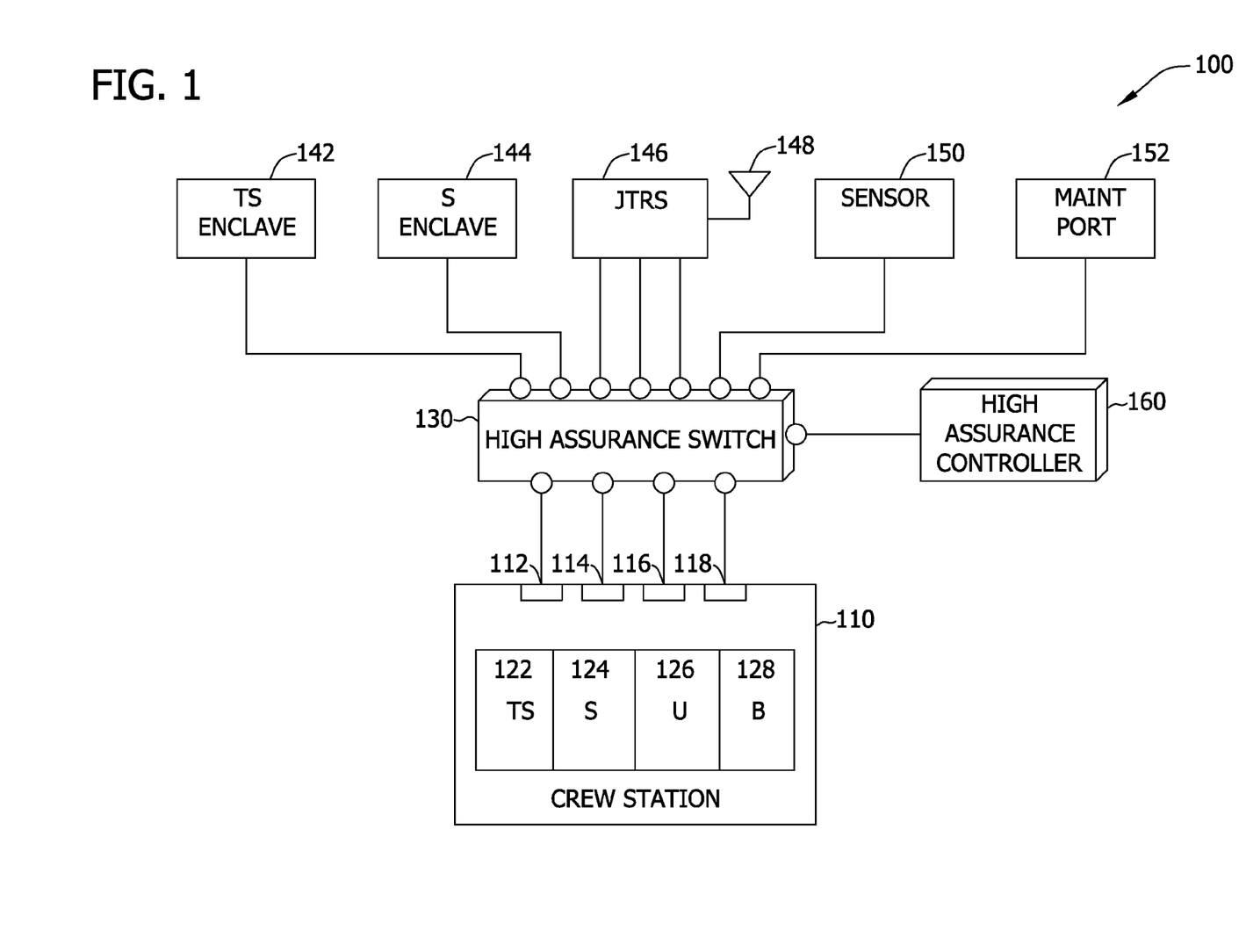
FIG. 1 is a block diagram of an exemplary system with a Multiple Independent Levels of Security based crew station utilizing multiple single level Local Area Networks.

Referring now to FIG. 1, an exemplary system 100 inmates a MILS implementation utilizing multiple single level local area networks (LANs). The system 100 includes a crew station 110 configured with a plurality of network interface cards (NICs) 112, 114, 116, and 118. Each of the plurality of NICs 112, 114, 116, and 118 is coupled to an individual software stack, such as, for example, TS 122, S 124, U 126, and B 128 in the crew station. Each of the plurality of NICs 112, 114, 116, and 118 is further coupled to a-high assurance switch 130. The high assurance switch is coupled to a plurality of application stacks, TS Enclave 142, S Enclave 144, JTRS 146 which is further coupled to an antenna 148, a Sensor 150 and a Maintenance port 152. The high assurance switch 130 is further coupled to a high assurance controller 160 for controlling aspects of the operations of the high assurance switch 130.

Figure 2:
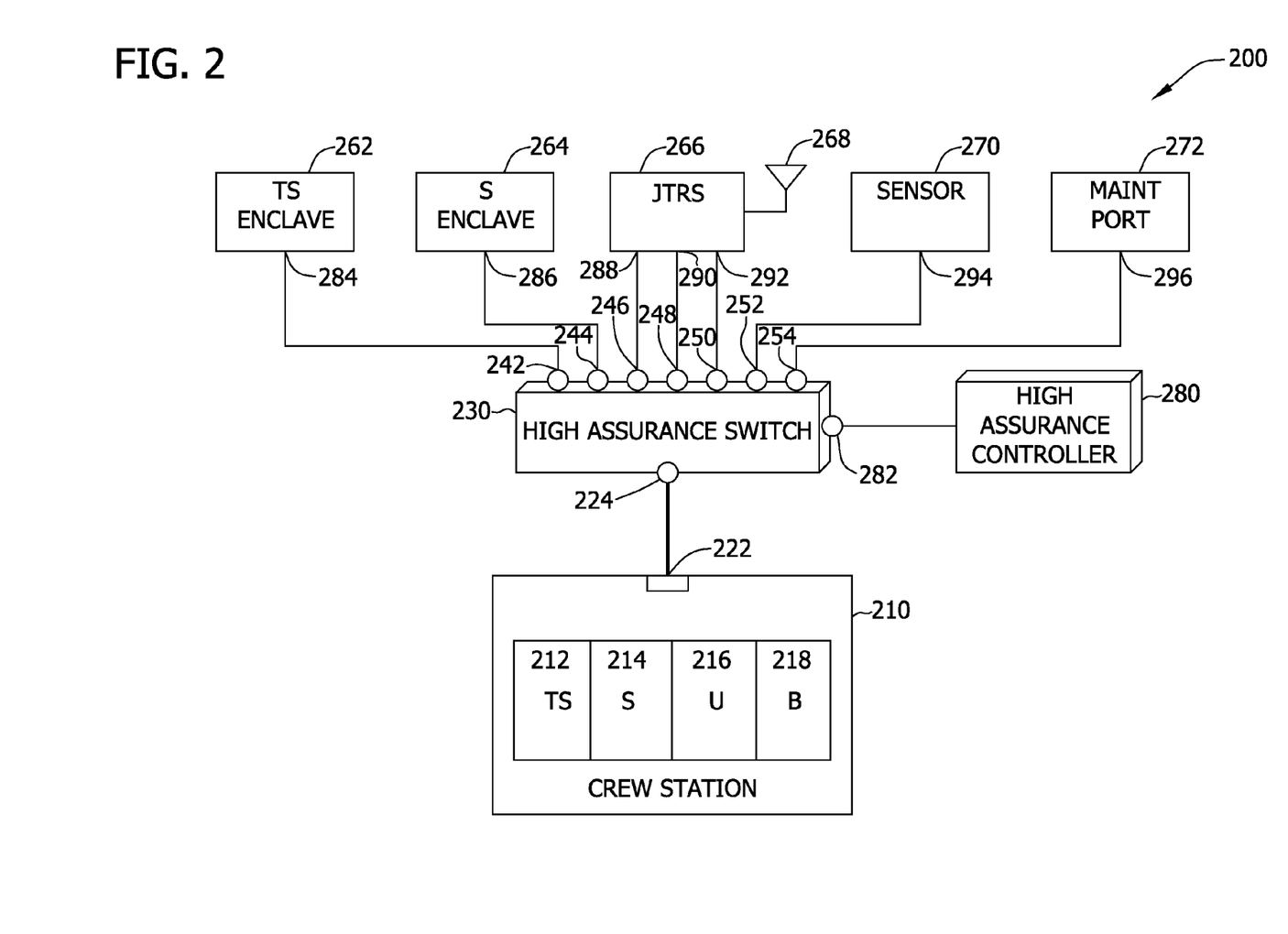
FIG. 2 is a block diagram of an exemplary system with a Multiple Independent Levels of Security based crew station and a multiple level Local Area Network.

Referring now to FIG. 2, an exemplary system 200 illustrates a MILS implementation utilizing a single LAN. To reduce the costs of wiring and hardware, current systems have implemented a single NIC interface to the processing stacks. In the illustrated embodiment, the system 200 contains a crew station 210 with access to a plurality of stacks, such as TS 212, S 214, U 216, and B 218. The plurality of stacks 212, 214, 216, and 218 are coupled to a single NIC 222 which is further coupled to a single port 224 of the high assurance switch 230 thus reducing the costs associated with wing and hardware. The high assurance switch 230 has a plurality of ports 242, 244, 246, 248, 250, 252, and 254 dedicated to a plurality of server application stacks, such as TS Enclave 262, S Enclave 264, JTRS 266 which is further coupled to an antenna 268, a Sensor 270 and a Maintenance port 272. The high assurance switch 230 is further coupled to a high assurance controller 280 via port 282 coupled to the high assurance switch 230. Each of the ports 242, 244, 246, 248, 250, 252, and 254 are coupled to a port 284, 286, 288, 290, 292, 294, and 296 on each of the processing stacks 262, 264, 266, 270, and 272. The system 200 of FIG. 2 reduces the number of NICs required in an embodiment of a MILS system compared to the embodiment presented in FIG. 1.

Figure 3:
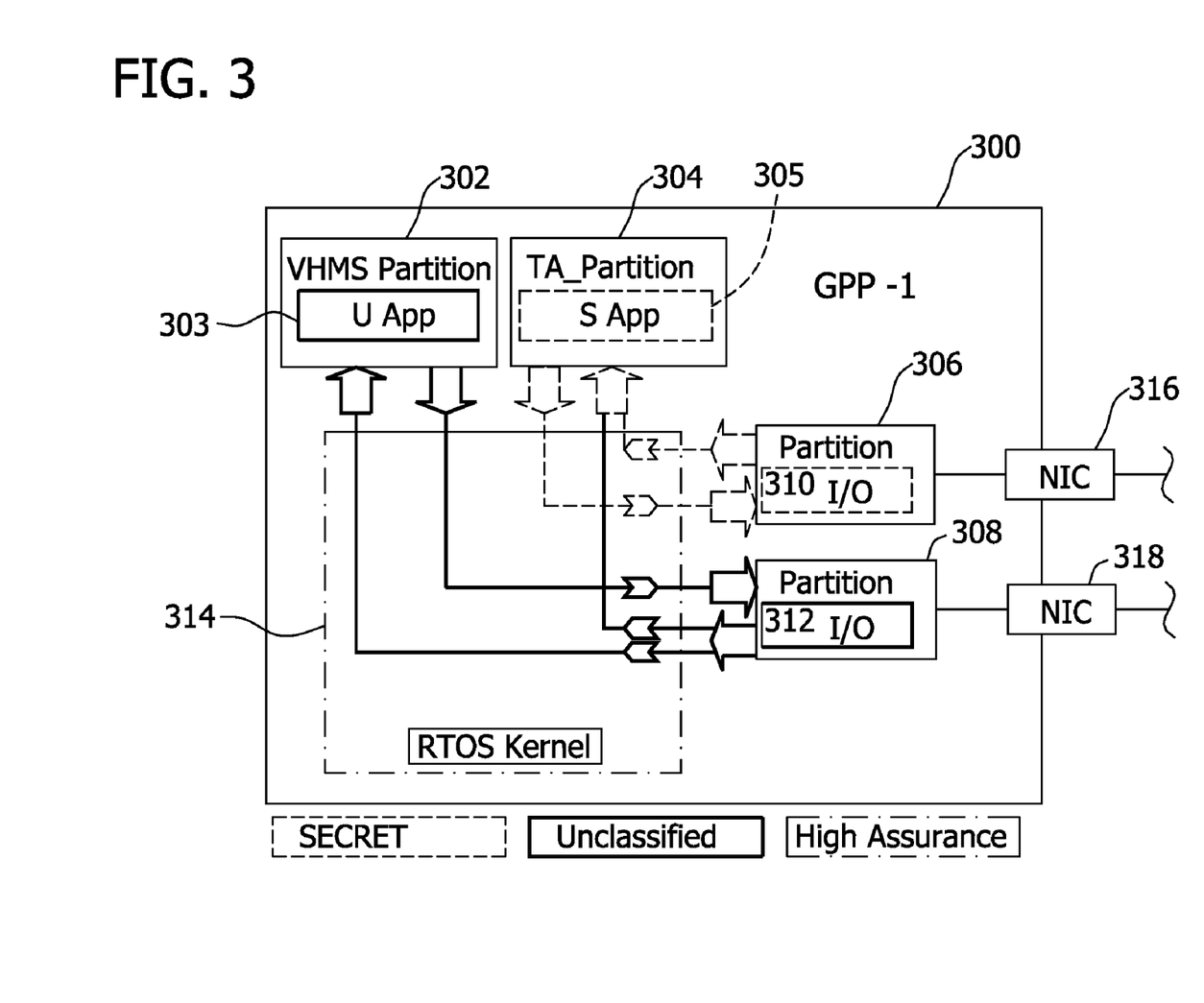
FIG. 3 is a block diagram of an exemplary system for Multiple Independent Levels of Security utilizing multiple single level Local Area Networks shown in FIG. 1.

Referring now to FIG. 3, an exemplary architecture 300 illustrates a system for MILS, which might be implemented in a system such as system 100 (shown in FIG. 1). In the illustrated embodiment, the MILS architecture 300 contains two processing partitions 302 and 304 of differing classification levels and two I/O partitions 306 and 308, each of which contains an Ethernet stack 310 and 312. A first I/O partition 308 is coupled to a first processing partition (TA Partition) 302 that includes a stack for interfacing with a user application 303 and a second input/output partition 306 is coupled to a second processing partition (TA Partition) 304 that includes a stack for interfacing with a server application 305. A high assurance Real Time Operating System (RTOS) kernel 314 ensures the separation of data between the various partitions and the one way operations between the partitions. The Ethernet stacks 310, 312 in each of the I/O partitions 306 and 308 communicate with the respective hardware NICs 316 and 318 via a shared memory (not shown). When the separate NICs 316 and 318 are collapsed into a single MLS LAN, a MILS/MLS interface problem arises because both I/O partitions 306 and 308 cannot access a single NIC's shared memory.

Figure 4:
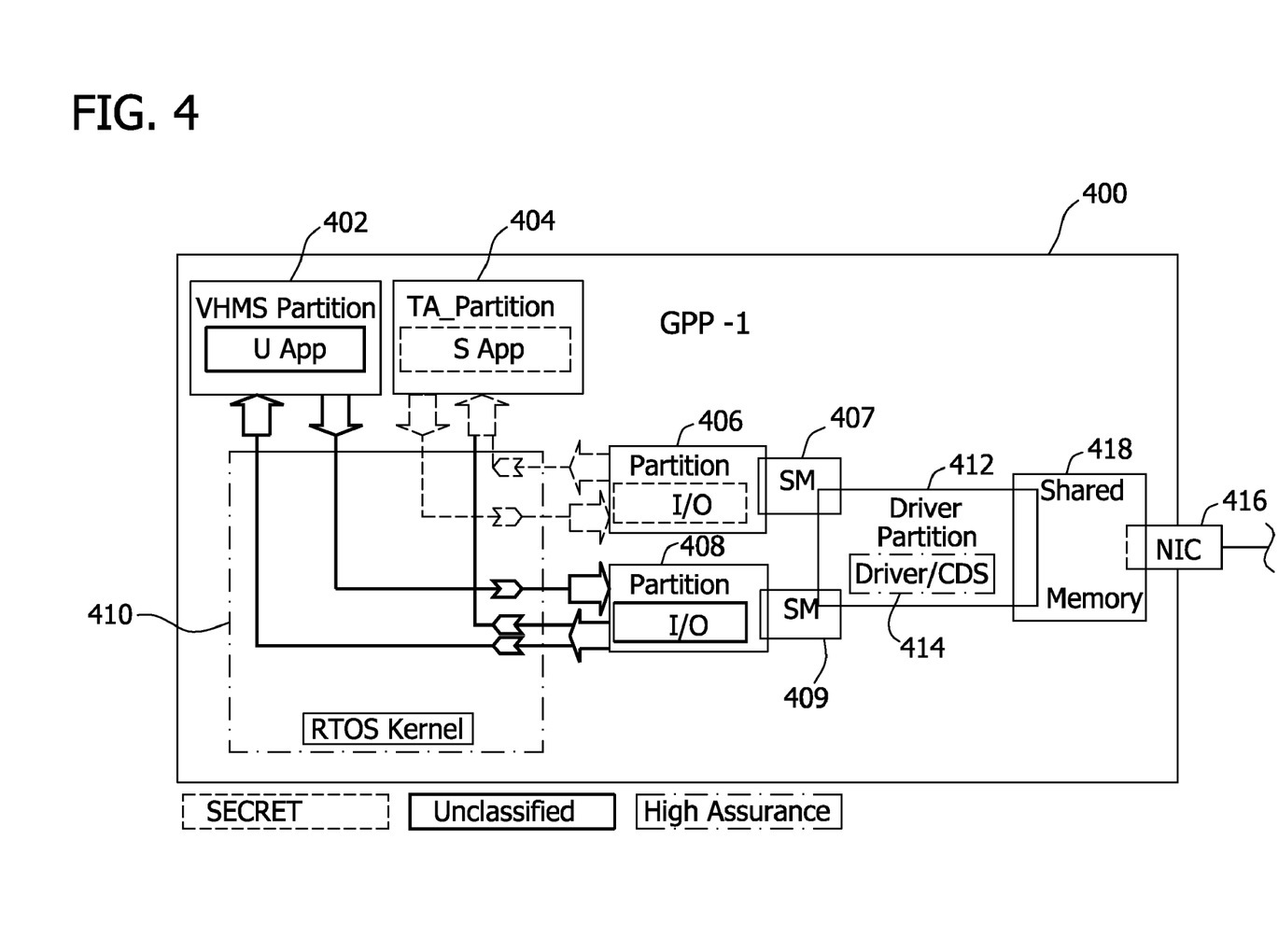
FIG. 4 is a block diagram of an exemplary system for Multiple Independent Levels of Security containing Multi-Level Security utilizing a middleware partition.

Referring now to FIG. 4, an exemplary schematic layout illustrates a system 400 for Multiple Independent Levels of Security containing Multi-Level Security utilizing a middleware partition. The system 400 contains two processing partitions, VHMS partition 402 and TA partition 404, and two I/O partitions 406 and 408. The I/O partitions 406 and 408 may be implemented using commercial off the self (COTS) stacks, proprietary stacks, or any combination of COTS and proprietary stacks, Although system 400 is illustrated as including two processing partitions and two I/O partitions, one of ordinary skill in the art would recognize that additional processing partitions and/or additional I/O partitions may be added and/or removed. A first input/output partition 408 is coupled to a first processing partition (VHMS Partition) 402 and a second. input/output partition 406 is coupled to a second processing partition (TA Partition) 404. The high assurance Real Time Operating System (RTOS) kernel 410 ensures the separation of data between the various partitions and the one way operations between the partitions.

I/O partition 406 is coupled to a shared memory 407 that is coupled to a driver partition 412, and I/O partition is couple to a shared memory 409 that is further coupled to the driver partition 412. The driver partition 412 includes a high assurance driver/Cross Domain Solution (CDS) 414, also known as a Guard. The high assurance driver/CDS 414 spoofs the I/O partitions 406 and 408 by emulating the NIC 416, thus not requiring modification of the COTS stacks, or evaluation to a high assurance level. Data separation is maintained by a main memory management unit (MMU) (not shown) and the high assurance evaluation of the high assurance RTOS kernel 410. The driver partition 412 is coupled to a shared memory 418. The shared memory 418 may be of any kind and/or type of memory, such as, for example, a cache, a RAM, a RAM, a database, a register, and dynamic storage area. The shared memory 418 may be used to store data necessary for the NIC 416 and/or data and tables accessible by the high assurance driver partition 412 and utilized by the high assurance driver/CDS stack 414. When a frame (not shown) is received by the NIC 416 and transferred to the high assurance driver partition 412, the security label is examined and the frame is forwarded to the appropriate processing partition 402 and 404 via the appropriate I/O partition 406 and 408.

Conversely, when a frame is transmitted from one of the I/O partitions 406 or 408, the frame is intercepted by the high assurance driver/CDS 414. The high assurance driver partition 412 consults the shared memory 418 to determine the appropriate security certification for the originating I/O partition and applies the appropriate security certification label. After the frame has the appropriate security certification label applied, the high assurance driver partition 412 delivers the frame to the NIC 416. The NIC 416 receives the frame from the high assurance driver partition 412 and forwards the frame towards the appropriate external stack (not shown) in the appropriate network (not shown). The network could be, for example, the Internet, a private network, a hybrid network, the Ethernet, a LAN, or a direct connect stack. The driver partition 412 is coupled to a memory area such as shared memory 418. Memory area 418 is further coupled to NIC 416.

Figure 5:
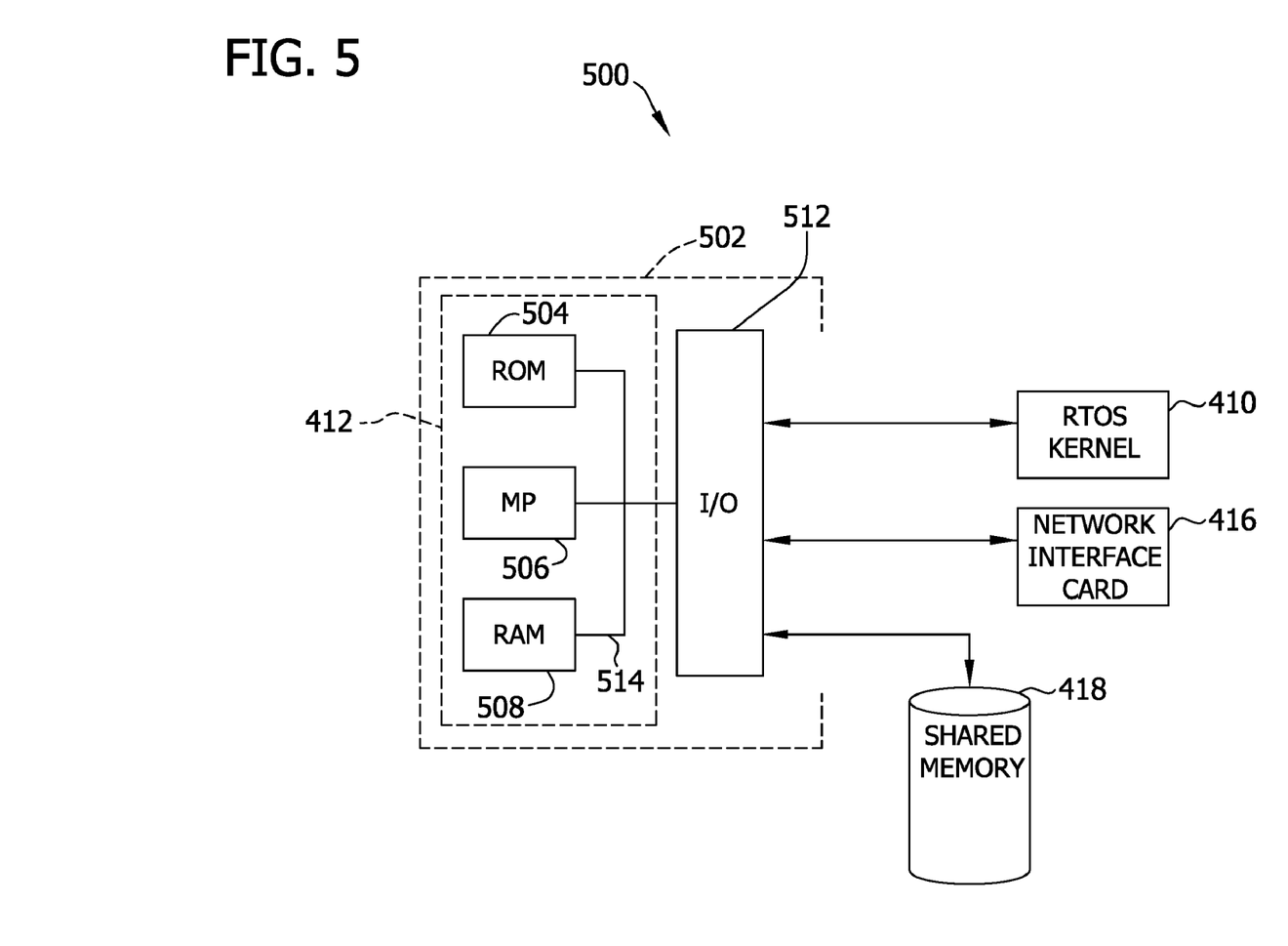
FIG. 5 is an exemplary circuit block diagram illustrating an interface to a middleware partition.

Referring now to FIG. 5, an exemplary circuit block diagram 500 illustrates an interface to a middleware partition 502 (shown in FIG. 5). In the exemplary embodiment, the middleware partition 502 includes a Driver/CDS partition 412 that includes a read-only memory (ROM) 504, a microcontroller or microprocessor (MP) 506, a random-access memory (RAM) 508, a memory area such as shared memory area 418 and an input/output (I/O) circuit 512, each coupled via an address/data bus 514. As used herein, the terms "controller" and "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the terms "controller" or "processor". Alternative embodiments of Driver/CDS partition 412 may include more than one microprocessor 506, multiple RAM modules 508, and/or multiple ROM modules 504. Moreover, one of ordinary skill in the art will appreciate that I/O circuit 512 may include any number or a plurality of different types of I/O circuits. Further, RAM 508 and/or ROM 504 may be implemented as, for example, semiconductor memories, magnetically readable memories, and/or optically readable memories. In one embodiment, operational components RTOS Kernel 410 and Network Interface Card 416 are coupled to I/O circuit 512 via a respective conductor. Alternative embodiments may include a single coupling between the operational components RTOS Kernel 410 and Network Interface Card 416 and I/O circuit 512. In the exemplary embodiment, I/O circuit 512 is coupled to a network (not shown) via a network interface card 416.

Figure 6:
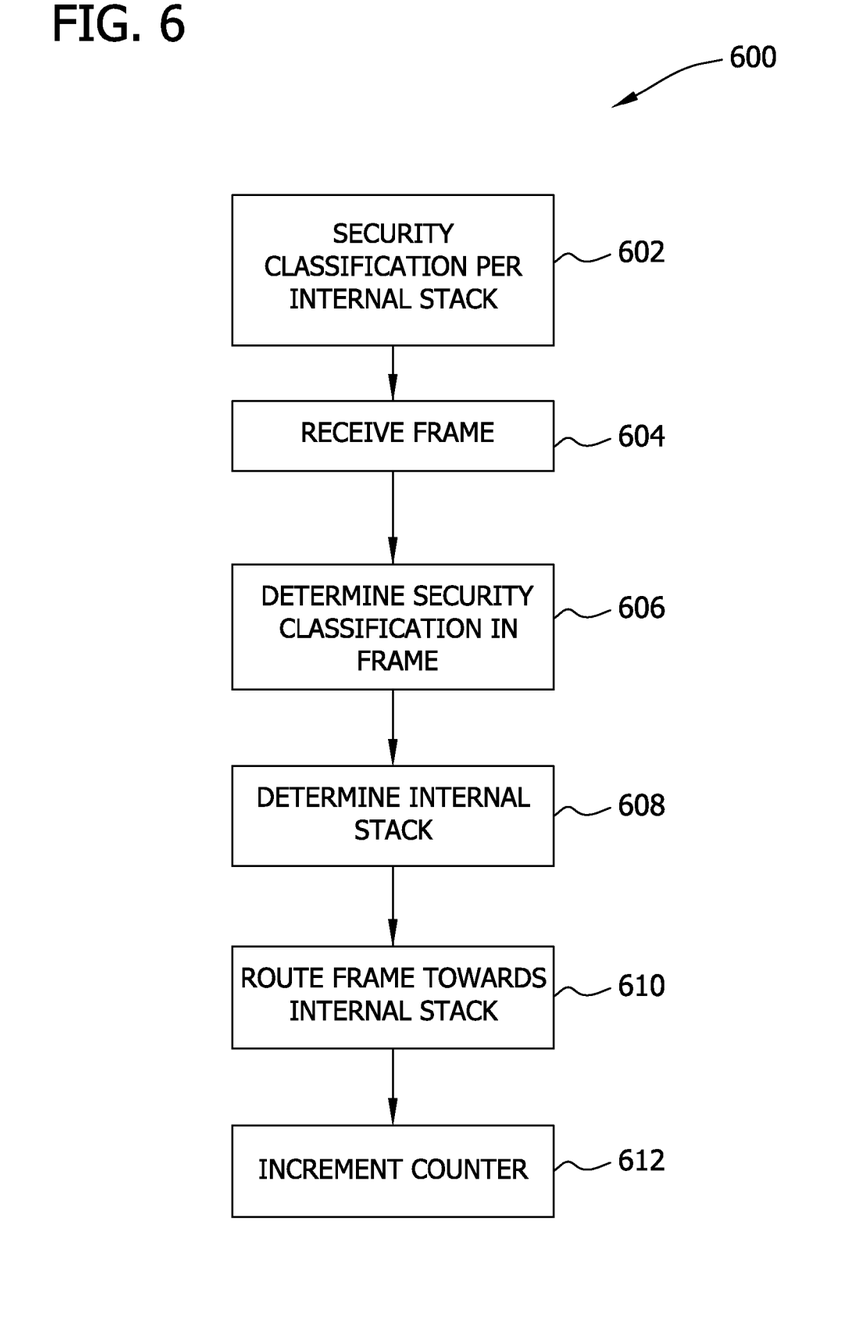
FIG. 6 is a flowchart illustrating a method for receiving a frame from an external stack via a network interface card and transmitting the frame to the appropriate internal stack at a middleware partition.

Now referring to FIG. 6, an exemplary flowchart 600 illustrates a method for routing an incoming packet from an external stack to an internal stack at a middleware partition 502 (shown in FIG. 5). Referring to flowchart 600, the memory at the middleware partition comprises 602 an assigned security classification to an internal stack.

The middleware partition 502 receives 604 a frame at the I/O partition 512 from an external stack via the NIC 416. The middleware partition 502 then determines 606 the security classifications assigned to the frame by the external stack. The middleware partition 502 determines 608 the internal stack to forward the frame to by comparing the assigned security classification in the frame with the stored security classification for each internal stack. The middleware partition 502 routes 610 the frame towards to the internal stack based on the security classification stored in the frame. The middleware partition 502 increments 612 a counter to indicate a frame was received and routed to an internal stack. The counter may be kept on a per internal stack basis, external stack basis, security classification basis, or any other basis determined by the administrator of the system. Processing continues with the next frame received 604 from either an I/O partition or from a network interface card.

Figure 7:
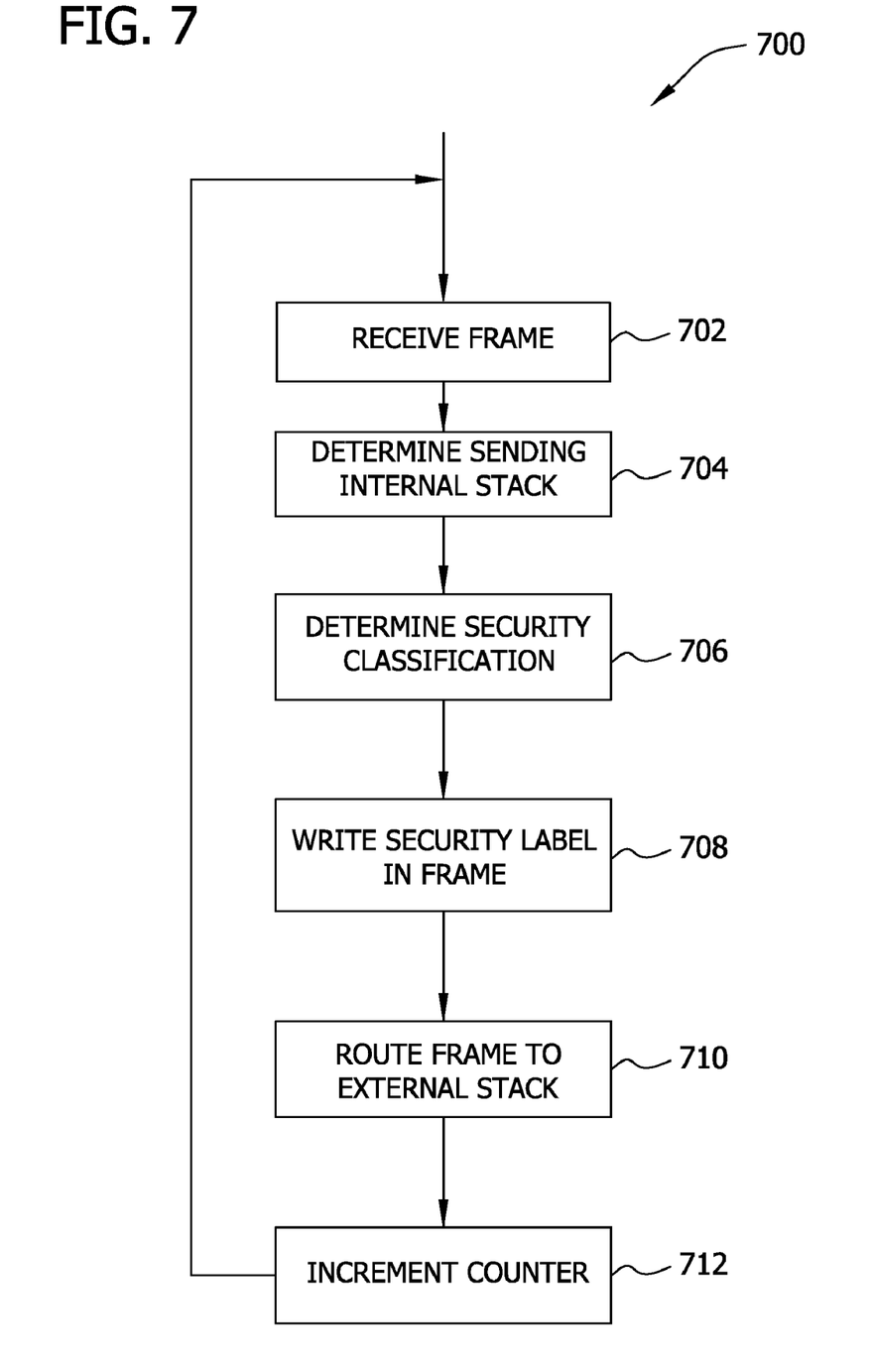
FIG. 7 is a flowchart illustrating a method for determining a security classification to assign to a frame from an internal stack destined for an external stack at the middleware partition.

Now turning to FIG. 7, an exemplary flowchart 700 illustrates a method for assigning a security classification to a frame sent from an internal stack destined for an external stack at a middleware partition 502 (shown in FIG. 5). A frame is received 702 at the middleware partition 502. The middleware partition determines 704 the internal stack sending the frame to an external stack.

The middleware partition 502 determines 706 the security classification based on the security classification of the internal stack sending the frame. The security classification is assigned to the internal stack at the initiation of the system. In another embodiment, the security classification may be updated by an administrator as the needs and desires of the system change over time. The middleware partition 502 writes 708 a security label including a security classification associated with the internal stack into the frame.

The middleware partition 502 routes 710 the frame towards the intended external stack via the NIC 416. The destination external stack was written into the frame by the internal stack creating the frame and the frame and size of the frame are rewritten to include the security label including the security classification. The middleware partition 502 increments 712 a counter to indicate a frame sent from the internal stack to an external stack. This counter may track the number of frames sent by an internal stack, destined for an external stack, based on the size of the frame, or any other method desired to be tracked by an administrator of the system. Processing continues with the next frame received 702 from either an I/O partition or from a network interface card.

The order of execution or performance of the operations in embodiments of the invention illustrated and described herein is not essential, unless otherwise specified. That is, the operations may be performed in any order, unless otherwise specified and embodiments of the invention may include additional or fewer operations than those disclosed herein. For example, it is contemplated that executing or performing a particular operation before, contemporaneously with, or after another operation is within the scope of aspects of the invention.

A computing device or computer such as described herein has one or more processors or processing units and a system memory. The computer typically has at least some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Aspects of the invention may be implemented with any number and organization of components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for providing multi-level security at a middleware partition, the method comprising:
   receiving by a computing device a frame from an external stack at the middleware partition, the frame destined for an internal stack of a plurality of internal stacks, each internal stack associated with a security classification, said frame having an assigned security classification associated therewith;
   determining by the computing device the internal stack associated with the security classification assigned in the frame; and
   routing by the computing device the frame to the determined internal stack based on the security classification stored in the frame.

2. A method in accordance with claim 1, further comprising coupling the determined internal stack to the middleware partition via a real time operating system kernel.

3. A method in accordance with claim 1, further comprising coupling the external stack to the middleware partition via a network interface card.

4. A method in accordance with claim 3, further comprising coupling the network interface card to at least one of a private network, an Ethernet, a wide area network, a local area network, and the Internet.

5. A method in accordance with claim 1, further comprising incrementing a counter associated with said external stack, wherein the counter is stored in shared memory.

6. A computer-implemented method for providing multi-level security at a middleware partition, the method comprising:
   receiving by a computing device a frame from an internal stack at the middleware partition, the frame destined for an external stack, said frame not having a security associated therewith;
   determining by the computing device the security classification based on the internal stack associated with the received frame;
   writing by the computing device a security label based on the determined security classification into the frame; and
   routing by the computing device the frame to the external stack based on information stored in the frame.

7. A method in accordance with claim 6, further comprising coupling the internal stack to the middleware partition via a real time operating system kernel.

8. A method in accordance with claim 6, further comprising coupling the external stack to the middleware partition via a network interface card.

9. A method in accordance with claim 8, further comprising coupling the network interface card to at least one of a private network, an Ethernet, a wide area network, a local area network, and the Internet.

10. A method in accordance with claim 6, further comprising incrementing a counter associated with said internal stack, wherein the counter is stored in shared memory.

11. A multi level security system, the system comprising:
   a network interface card;
   a plurality of internal stacks;
   a memory area comprising a plurality of security classifications associated with each of said plurality of internal stacks; and
   a middleware partition coupled to said network interface card, said plurality of internal stacks and said memory area, said middleware partition including a microprocessor programmed to:
      receive a frame from an internal stack of said plurality of internal stacks, said frame destined for an external stack coupled to said network interface card, the frame having a identifier associated with the external stack therewith, the frame not having a security classification associated therewith;
      determine the security classification associated with the internal stack sending the frame;
      write a security label including the determined security classification associated with the internal stack into the frame; and
      route the frame to the external stack.

12. A system in accordance with claim 11, wherein the external stack is coupled to said network interface card.

13. A system in accordance with claim 11, wherein the network interface card is coupled to at least one of a private network, an Ethernet, a wide area network, a local area network, and the Internet.

14. A system in accordance with claim 11, wherein said microprocessor of said middleware partition is further programmed to:
   increment a counter associated with said internal stack, wherein the counter is stored in shared memory.

15. A system in accordance with claim 11, wherein the internal stack is coupled to the middleware partition via a real time operating system kernel.

16. A system in accordance with claim 11, wherein the external stack is coupled to the middleware partition via a network interface card.

17. A system in accordance with claim 11, wherein the network interface card is coupled to at least one of a private network, an Ethernet, a wide area network, a local area network, and the Internet.

* * * * *